Oct. 24, 1961 W. L. WUSTER 3,005,928
SAWTOOTH GATING SWEEP CIRCUIT PROVIDING ADJUSTABLE D.C. REFERENCE LEVEL
Filed Feb. 26, 1959
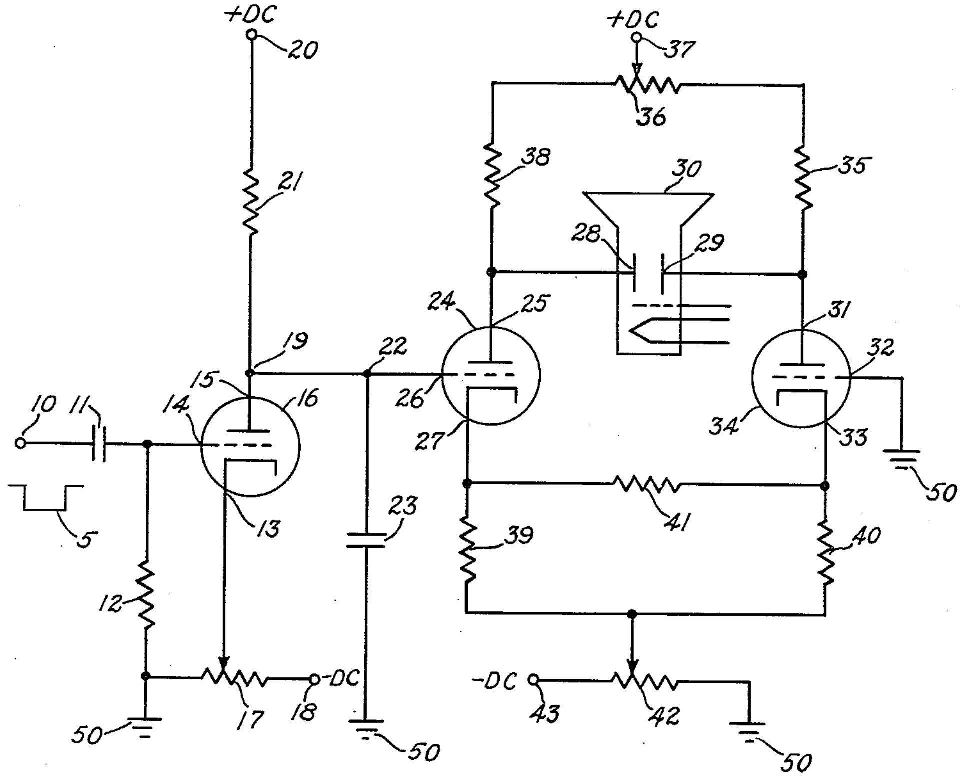
INVENTOR.
WALTER L. WUSTER
BY
H. H. Losche
ATTORNEYS 3,005,928

SAWTOOTH GATING SWEEP CIRCUIT PROVIDING ADJUSTABLE D.C. REFERENCE LEVEL

Walter L. Wuster, Indianapolis, Ind., assignor to the United States of America as represented by the Secretary of the Navy Filed Feb. 26, 1959, Ser. No. 795,875
5 Claims. (Cl. 315—26)
(Granted under Title 35, U.S. Code (1952), sec. 266)

The invention described herein may be manufactured and used by or for the Government of the United States of America for governmental purposes without the payment of any royalty thereon or therefor.

This invention relates broadly to electrical systems and more particularly to sweep or scanning circuits of the type employing sawtooth wave generation and beam positioning control means in the display of pictures, wave shapes, et cetera, upon the sensitized face of a cathode ray tube.

It has heretofore generally been the practice in sweep or scanning circuit design to provide at least two separate circuit functions in order to establish a direct current (D.C.) voltage level at deflection plates of a cathode ray tube for such purposes as positioning the beam, and to furnish means for generating a gated sawtooth wave. By providing separate circuit functions, the complexity of the overall circuit is somewhat greater than is desirable. According to a specific embodiment of the present invention, there is directly established a D.C. level at the deflection plates of a cathode ray tube and, using the same circuit, a gated sawtooth deflection voltage is provided. However, the present invention is equally well suited to directly establish a D.C. level and provide a gated sawtooth for any means requiring this type of input including bias responsive means other than cathode ray tubes.

In this invention, a vacuum tube is used having a grid coupled to a gating signal input, and an anode coupled to a charging capacitor and to the grid of a deflection amplifier. The cathode is coupled to an adjustable potential. The vacuum tube is used as a variable resistor to establish the D.C. reference level at its anode through voltage divider action prior to initiation of the sawtooth sweep. The tube is also used as the switch to initiate the start of the sawtooth voltage sweep generated by a resistor and the charging capacitor in its anode circuit. The D.C. reference voltage and the sawtooth are directly coupled into the deflection amplifier grid. The amplitude of the sawtooth is controlled either by the length of the gating pulse or by the RC time constant in the vacuum tube anode circuit. At the termination of the gating pulse, the D.C. voltage divider action of the tube returns the anode voltage to its reference level.

It is a general object of the invention to provide a sawtooth generating circuit incorporating a means for establishing a D.C. reference level at an output.

It is a more specific object of the invention to directly establish a D.C. level at the deflection plates of a cathode ray tube display and to use the same circuit as a gating means for a sawtooth deflection voltage.

It is a still more specific object of the invention to use the D.C. voltage level established for centering purposes.

Other objects and possible uses of the invention will become apparent when the detailed invention description which follows is read with the aid of the single figure of the drawing which shows the preferred embodiment of the invention.

Referring to the figure of drawing, triode 16 has its grid 14 coupled through coupling capacitor 11 to a gate signal input terminal 10. Grid 14 is connected through biasing resistor 12 to ground 50. Cathode 13 of triode 16 is connected to the movable tap of potentiometer 17 which is connected between ground 50 and a source of negative D.C. potential 18 to provide a voltage divider. Anode 15 is coupled through resistance 21 to a source 20 of positive D.C. potential, through charging capacitor 23 to ground, and directly to the grid 26 of sweep amplifier triode 24. The anode 25 of triode 24 is coupled to deflection plate 28 of a cathode ray indicator 30 and to a source 37 of positive D.C. potential through anode load resistance 38 and one end of potentiometer 36. Triode 34 has an anode 31 coupled to deflection plate 29 which is opposite deflection plate 28. Triodes 24 and 34 may be sections of a twin triode and with the associated circuitry, operate as a differential amplifier. The anode 31 of tirode 34 is also coupled through anode load resistance 35 and one end of potentiometer 36 to the source 37 of positive D.C. potential. Grid 32 of triode 34 is coupled to ground. Cathode 33 of triode 34 is coupled through feedback resistance 41 to cathode 27 of triode 24 and through resistance 40 to the movable tap of potentiometer 42 which is connected between a source of negative D.C. potential at 43 and ground to form a voltage divider. Cathode 27 of triode 24 is connected through resistance 39 to the movable tap of potentiometer 42.

Triode 16 is normally conducting and has zero bias. Taking, for example, the case where deflection plates 28 and 29 are the vertical deflection plates of a cathode ray tube 30, though the invention is equally applicable to horizontal plates, the cathode of triode 16 has its potential adjusted by potentiometer 17 so that its anode is at a slightly negative voltage reference level. This causes the resting position of the vertical sweep to be at the bottom of the cathode ray tube 30 rather than at the center, since the anode voltage of triode 16 is directly coupled to the grid 26 of the vertical sweep amplifier triode 24.

A negative gate pulse, designated by the numeral 5 in the drawing, is applied at terminal 10, through capacitor 11 to the grid 14 of triode 16. This pulse cuts off the triode. The anode voltage begins to rise from the reference level at a rate determined by resistance 21 and capacitor 23. This rise in voltage produces the rising ramp of a sawtooth.

The rising ramp of the sawtooth is conducted directly to the grid of triode 24 increasing the current therethrough. This results in a drop in potential at the anode 25 and so at deflection plate 28 of the cathode ray tube 30. The cathode 27 potential rises with the increased current flow and the circuit feedback resistor 41 causes cahtode 33 of triode 34 to rise in potential. Current through triode 34 is therefore decreased so the potential at its anode 31 and at deflection plate 29 rises. The cooperation of the potentials at deflection plates 28 and 29 cause a deflection of the beam of the cathode ray tube and a display representing the output sweep voltage generated at the anode of triode 16. At the end of the gate pulse, triode 16 is again rendered conducting and the sweep voltage returns to the reference level. Accordingly, the display returns to its initial condition.

In the differential amplifier, circuit control potentiometer 36 is used to balance the load currents in the two triodes 24 and 34. Separate cathode resistors 39 and 40 are used so that linearity can be improved with the feedback resistor 41. The operating bias for the differential amplifier is obtained from the source of negative D.C. potential 43 through the voltage dividing action of the potentiometer 42 connected to ground.

While it is customary to adjust the cathode potential of triode 16 so that the resting position of the vertical sweep is at the bottom of the cathode ray tube, it is a feature of the invention that the potential is adjustable so that the sweep can be positioned on the tube as desired.

This suggests the possibility, for example, of changing the potential in steps to provide a series of displays, or to couple in marker pips or other information at the cathode.

While a preferred embodiment of my invention has been described, it should be apparent that certain modifications and various uses thereof may be made without departing from the scope of the invention, which scope is to be limited only by the following claims.

The following is claimed:

1. A sweep circuit comprising: a cathode ray tube for display purposes, said tube having deflection plates; a differential amplifier including first and second triode sections coupled to a source of supply and to said cathode ray tube deflection plates; and a sawtooth generator including a triode having an anode coupled through a resistance to a source of positive potential and through a charging capacitance to ground, said resistance and capacitance elements having a resistance-capacitance time constant determining the wave shaping of the generated waveform and said anode further direct coupled to a grid of said first triode section, having a cathode coupled to an adjustable voltage source for said cathode to establish a circuit constituting means for providing an adjustable direct current voltage reference level at said anode and through direct coupling means to deflection plates of said cathode ray tube, and having a grid coupled to an input for a gating signal to provide for switching of said triode.

2. The sweep circuit of claim 1 wherein said adjustable voltage source is a voltage divider including an adjustable resistance coupled between ground and a source of negative potential and having an adjustable tap coupled to said cathode.

3. A circuit for establishing a reference direct current voltage level and providing a gated sawtooth voltage waveform, said circuit comprising: an electron discharge device having a first electrode coupled to a charging capacitor and through a resistance to a source of positive supply potential for producing a sawtooth voltage waveform, the combination of said capacitor and said resistance having a resistance-capacitance time constant controlling the wave shaping of said waveform, a second electrode coupled to an adjustable voltage divider coupled between a source of negative potential and a source of constant potential for adjusting current flow through said device to produce an adjustable direct current voltage of a desired reference level at an output coupled to said first electrode, and a third electrode control means coupled to an input to receive a gating signal for controlling conduction of said electron discharge device to produce a gated sawtooth voltage waveform at said output, superimposed upon said adjustable voltage of a desired reference level.

4. The circuit of claim 3 wherein said electron discharge device is a vacuum tube, said first electrode is an anode, said second electrode is a cathode, and said third electrode control means is a grid capactively coupled to said input and resistively coupled to said source of constant potential.

5. A sweep circuit comprising: a triode having an anode coupled through a first resistance to a source of positive potential and coupled directly to an output, a cathode coupled to an adjustable tap of a voltage divider connected between a source of negative potential and a source of constant potential establishing a circuit to produce an adjustable direct current reference voltage level at said anode output, a grid coupled through a biasing resistance to said source of constant potential and to a signal input means to establish modes of operation by control of said triode; and a charge accumulating means coupled between said anode and said source of constant potential for generating a ramp function voltage waveform at said anode output in response to signals at said input, said charge accumulating means and said first resistance means having a resistance-capacitance time constant for shaping said waveform which is superimposed upon said voltage level established by said adjustable tap.

References Cited in the file of this patent

UNITED STATES PATENTS

| | | |
|---|---|---|
| 2,244,013 | Knoop | June 3, 1941 |
| 2,360,697 | Lyman | Oct. 17, 1944 |
| 2,458,367 | Fyler | Jan. 4, 1949 |
| 2,487,602 | Schoenfeld | Nov. 8, 1949 |
| 2,508,879 | Zagor | May 23, 1950 |
| 2,524,712 | Ostreicher | Oct. 3, 1950 |
| 2,662,981 | Segerstrom | Dec. 15, 1953 |
| 2,740,071 | Goldmark | Mar. 27, 1956 |
| 2,753,451 | Cetrone | July 3, 1956 |
| 2,817,043 | Stein | Dec. 17, 1957 |